US008807547B2

(12) United States Patent
Jung

(10) Patent No.: US 8,807,547 B2
(45) Date of Patent: Aug. 19, 2014

(54) SPRING HOUSING UNIT CONNECTED WITH SPRING ACTUATOR FOR SWITCHGEAR

(75) Inventor: Jae Woong Jung, Cheongju (JP)

(73) Assignee: LSIS Co., Ltd., Anyang, Gyeonggi-Do (KR)

( * ) Notice: Subject to any disclaimer, the term of this patent is extended or adjusted under 35 U.S.C. 154(b) by 206 days.

(21) Appl. No.: 13/329,134

(22) Filed: Dec. 16, 2011

(65) Prior Publication Data

US 2012/0168293 A1 Jul. 5, 2012

(30) Foreign Application Priority Data

Dec. 29, 2010 (KR) .................... 20-2010-0013553 U

(51) Int. Cl.
*F16F 1/12* (2006.01)
*H01H 5/06* (2006.01)

(52) U.S. Cl.
CPC ........................................ *H01H 5/06* (2013.01)
USPC ............................ 267/174; 267/179; 200/400

(58) Field of Classification Search
USPC ............... 267/69, 70, 71, 170, 172, 173, 174, 267/175, 176, 179, 166, 166.1, 248, 249, 267/255; 200/288, 290, 400; 403/321, 348, 403/350
See application file for complete search history.

(56) References Cited

U.S. PATENT DOCUMENTS 1,309,850 A * 7/1919 Horne ........................... 267/249
1,400,372 A * 12/1921 Newton ........................ 267/237
2,004,539 A * 6/1935 Rossman ...................... 267/249
2,793,902 A * 5/1957 Govan, Jr. ..................... 403/321
2,867,863 A * 1/1959 Webb et al. ................... 403/321
2,995,327 A * 8/1961 Wood ............................. 267/71
4,800,242 A * 1/1989 Yin ............................... 200/400
5,006,682 A 4/1991 Sloff et al.
7,633,364 B2 * 12/2009 Moffat et al. ................. 200/400
2007/0163869 A1 * 7/2007 Courbon et al. .............. 200/400

FOREIGN PATENT DOCUMENTS

| | | |
|---|---|---|
| CN | 2879394 | 3/2007 |
| CN | 101834074 | 9/2010 |
| GB | 758428 | 10/1956 |

OTHER PUBLICATIONS

State Intellectual Property Office of the People's Republic of China Application Serial No. 201110449846.X, Office Action dated Feb. 11, 2014, 6 pages.

* cited by examiner

*Primary Examiner* — Thomas J Williams
(74) *Attorney, Agent, or Firm* — Lee, Hong, Degerman, Kang & Waimey

(57) ABSTRACT

A spring housing unit connected to a switch actuator for a switchgear, which is compact and easily installed, the spring housing unit comprises a main spring housing configured as a hollow cylinder, having a flange portion formed at one end portion thereof to support one end portion of a spring, and accommodating the spring therein such that the spring is compressed or elongated; a sub-spring housing connected to the other end portion of the main spring housing such that it is separated therefrom; and a compressing cover insertedly positioned in the main spring housing and compressing the spring.

11 Claims, 6 Drawing Sheets

SPRING HOUSING UNIT CONNECTED WITH SPRING ACTUATOR FOR SWITCHGEAR

CROSS-REFERENCE TO RELATED APPLICATION

Pursuant to 35 U.S.C. §119(a), this application claims the benefit of earlier filing date and right of priority to Korean Application No. 20-2010-0013553, filed on Dec. 29, 2010, which is herein expressly incorporated by reference in its entirety.

BACKGROUND OF THE INVENTION

1. Field of the Invention

The present invention relates to a switchgear and, more particularly, to a spring housing unit connected with a spring actuator in order to charge or discharge elastic force, as a means for accommodating a spring that provides a switching driving force of a switchgear.

2. Description of the Related Art

In general, in an electric power system or an electric power circuit for power transmission or transformation of electric energy, a switchgear is a device for opening or closing the electric power circuit between an electric power source and an electric load, earthing(grounding) the electric power circuit, or breaking the electric power circuit when a fault current such as a short-circuit current, or the like, occurs in the electric power circuit.

Since high voltage of thousands of volts or tens of thousands of volts is used in the electric power circuit, the switchgear must be configured to be received in a tank type metal container charged with inert insulating gas such as SF6 having excellent electrical insulating characteristics or configured to form an enclosure of constituent components of a switching mechanism for each pole (or phase) with a solid insulating material such as epoxy.

Such a switchgear comprises a stationary contactor electrically connected with an electric power source of the electric power circuit and having a contact, a movable contactor electrically connected with an electric load of the electric power circuit, being movable to a closing position at which the movable contactor can be in contact with the stationary contactor or an opening position at which the movable contactor is separated from the stationary contactor, a switching mechanism for driving the movable contactor to the closing position or the opening position, and a spring actuator for actuating a spring, which provides elastic energy as a driving source of the switching mechanism, to charge or discharge the elastic energy.

The switching mechanism may further comprise a closing spring providing elastic energy for driving the movable contactor to the closing position, a link mechanism transferring a driving force, an opening spring (in other words trip spring) for driving the movable contactor to the opening position, and a cam connected between the driving source and the closing spring and being rotatable to charge elastic energy in the closing spring.

The actuator may further comprise a driving motor for rotating the cam, a deceleration gear assembly, a charging gear, or the like.

FIG. 1 is a schematic view explaining a spring actuator according to the related art. With reference to FIG. 1, a spring actuator 1 may comprise a motor M, a driving gear 2 provided to a rotational shaft of the motor M, a deceleration gear meshed to the driving gear 2, and a charging gear 4 meshed to the deceleration gear 3. Although not shown, the spring actuator may further comprise a latch mechanism for restraining the charging gear 4 at a predetermined position and a releasing mechanism for releasing the latch mechanism.

The spring housing unit of the related art connected to the spring actuator comprises a spring 5 compressed or elongated according to a rotation of the charging gear to provide elastic energy for an opening position operation or closing position operation of the switchgear, and configured as a compression coil spring, a spring housing 6 accommodating the spring 5 therein and supporting one end of the spring 5 by a flange portion thereof, a cover 7 slidably installed in the spring housing 6 and supporting the other end of the spring 5, a connection rod 8 meshed to the cover 7 and having an outer circumferential surface formed as a threaded face, and a chain 9 having one end coupled to the connection rod 8 and the other end eccentrically coupled to the charging gear 4.

The spring 5 connected to the spring actuator according to the related art provides an energy source for the switchgear to actuate to the opening position and the closing position, which, thus, plays key role in the switchgear.

Meanwhile, a process of installing the spring 5 and assembling the spring housing 6 will be described.

With reference to FIG. 1, the spring 5 is positioned within the spring housing such that one end of the spring 5 is supported by the spring housing 6. Here, the spring 5 is not compressed. Next, the cover 7 enters the spring housing 6 through the other opened end of the spring housing 6, and then, meshed on an outer circumferential face of the connection rod 8.

Next, as can be understood from FIG. 2, the cover 7 is pressed by a spring jig 10 so as to be pushed into the spring housing 6, whereby the spring 5 is compressed by a predetermined initial compression length L between the movable cover 7 and an end portion (flange portion) of the fixed spring housing 6. After the spring 5 is compressed by the initial compression length L, the spring jig 10 is removed. Accordingly, the installation of the spring 5 in the spring housing 6 is completed.

In this state, the chain 9 connected to the connection rod 8 is connected to the charging gear 4 comprised in the spring actuator 1, whereby the connection of the assembly of the spring 5 and the spring housing 6 to the spring actuator 1 can be completed.

Namely, thereafter, the chain 9 is pulled by the driving of the spring actuator 1 to compress the spring 5 by the connection rod 8 and the cover 7 to charge electrical energy, and when a user requests closing the switchgear by manipulating a corresponding button, or the like, the corresponding elastic energy is discharged to drive the switching mechanism of the switchgear to the closing position.

However, in the related art spring housing unit, after completing assembling of the spring housing unit, a space corresponding to the initial compression length L unnecessarily remains at one side of the spring housing 6, causing a problem in which the size of the switchgear is increased by the corresponding initial compression length L.

Also, in the related art spring housing unit, in order to separate the spring housing 6 from the spring actuator 1, the initial charged energy of the spring 5 installed upon being compressed by the initial compression length L should be discharged by elongating the spring 5 by using the spring jig, and then, the spring housing 6 is separated from the spring actuator 1 in terms of safety of an operator, causing a problem in which the number of processes is increased and a great amount of time is required.

SUMMARY OF THE INVENTION

An aspect of the present invention provides a spring housing unit connected to a spring actuator for a switchgear capable of reducing the size of a spring housing by eliminating the portion of the spring housing corresponding to an initial compression length of a spring of the switchgear after the spring is installed in the spring housing.

Another aspect of the present invention provides a spring housing unit connected to a spring actuator for a switchgear capable of separating a spring housing from a spring actuator without having to discharge elastic energy by an initial compression distance of the compressed spring when the spring housing is installed.

According to an aspect of the present invention, there is provided a spring housing unit connected to a spring actuator for a switchgear, comprising: a main spring housing configured as a hollow cylinder, having a flange portion formed at one end portion thereof to support one end portion of a spring, and accommodating the spring therein such that the spring is compressed or elongated;

a sub-spring housing connected to the other end portion of the main spring housing such that it is separated therefrom; and a compressing cover insertedly positioned in the main spring housing and compressing the spring.

The another aspect of the present invention can be accomplished by providing the spring housing unit may further comprise an occluding member installed to occlude the other end portion of the main spring housing when the sub-spring housing is separated from the main spring housing.

The foregoing and other objects, features, aspects and advantages of the present invention will become more apparent from the following detailed description of the present invention when taken in conjunction with the accompanying drawings.

DETAILED DESCRIPTION OF THE INVENTION

A configuration and operation of a spring housing unit connected to a spring actuator for a switchgear according to embodiments of the present invention will be described with reference to FIGS. 3 to 9.

First, a configuration of the spring housing unit connected to a spring actuator for a switchgear according to an embodiment of the present invention will be described with reference to FIG. 3.

Figure 1:
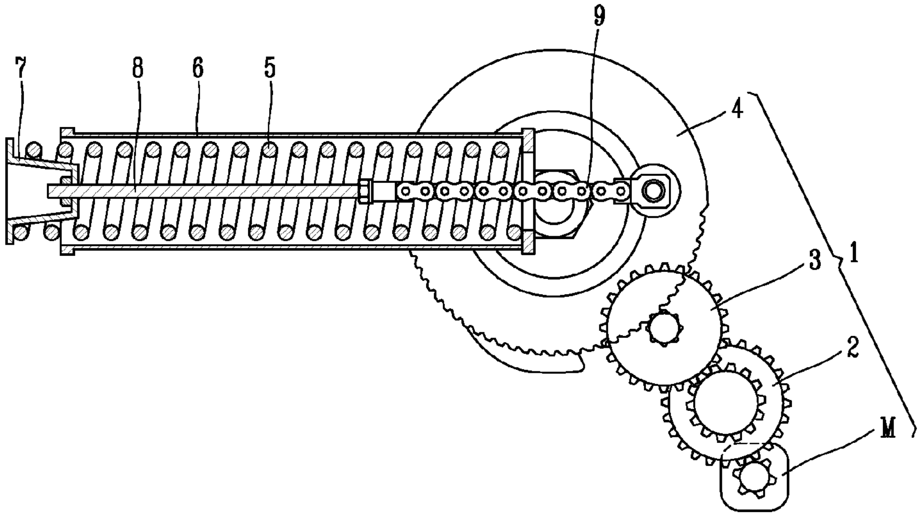
FIG. 1 RELATED ART
FIG. 1 is a sectional view showing an initial assembling state of a spring and a spring housing according to the related art.
Figure 2:
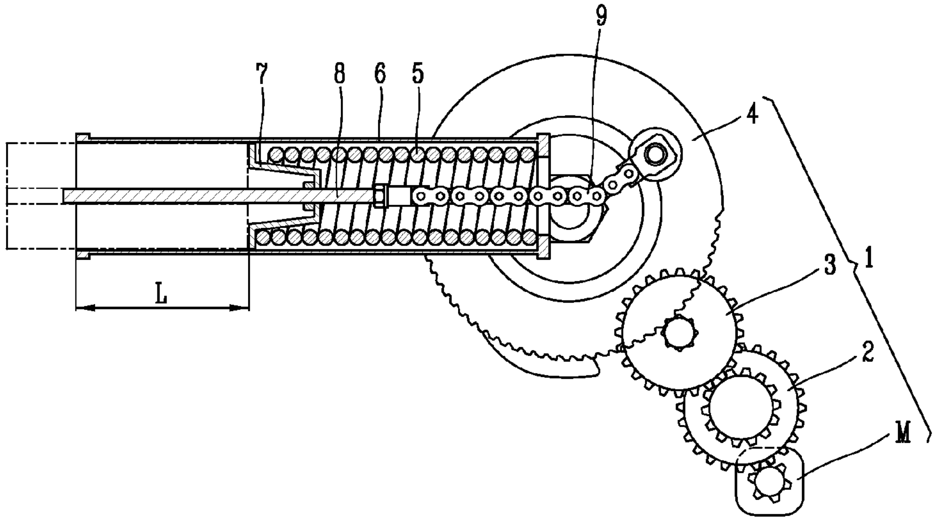
FIG. 2 RELATED ART
FIG. 2 is a sectional view showing a state in which the spring is assembled to be compressed by an initial compression length by a spring jig within the spring housing.
Figure 3:
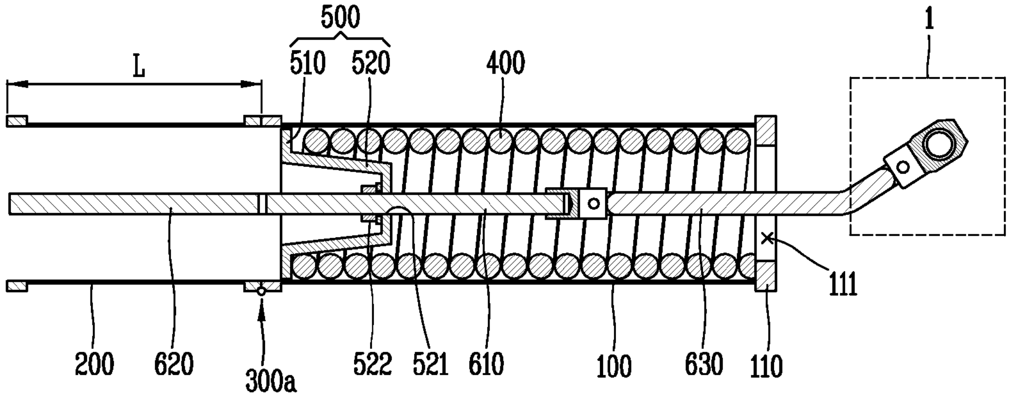
FIG. 3 is a sectional view showing an overall configuration of the spring housing unit connected to a spring actuator for a switchgear according to an embodiment of the present invention for spring assembling.

First, as shown in FIG. 3, the spring housing unit connected to a spring actuator for a switchgear according to an embodiment of the present invention comprises a main spring housing 100, a sub-spring housing 200, and a compressing cover 500.

The main spring housing 100 is configured as a hollow cylinder, having a flange portion 110 with an opening 111 formed at one end portion thereof to support one end portion of a spring 400, and accommodate the spring 400 such that the spring 400 can be compressed or elongated.

The length of the main spring housing 100 is shorter by the initial compression length L of the spring 400 than the related art spring housing 6.

The sub-spring housing 200 is a spring housing connected to the other end portion of the main spring housing 100 such that it can be separated from the main spring housing 100.

The compressing cover 500 is inserted in the main spring housing to compress the spring 400. The compressing cover 500 comprises an annular outer edge portion 510 and a protruded body portion 520 formed to be protruded from an inner side of the outer edge portion 510. The protruded body portion 520 comprises a through hole 521 formed at a central portion thereof to allow a first connection rod 610 to pass therethrough. Here, the other end of the spring 400 may be supported by the outer edge portion 510 of the compressing cover 500. Thus, when the compressing cover 500 is pressed into the spring housing 100 by external force, the spring 400 can be compressed in a state of being supported by the outer edge portion 510 of the sprig 400.

As can be understood from FIG. 3, in order to connect or separate the sub-spring housing 200 and the other end portion of the main spring housing 100, the spring housing unit connected to a spring actuator for a switchgear according to an embodiment of the present invention further comprises a hinge 300*a* installed over the sub-spring housing 200 and the other end portion of the main spring housing 100.

Figure 7:
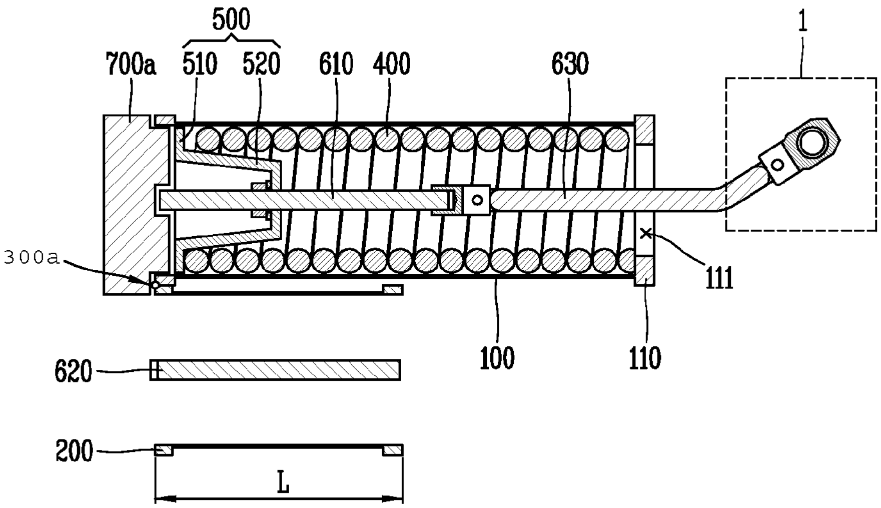
FIG. 7 is a view showing a assembled state in which the sub-spring housing of the spring housing unit is folded and an opened end portion of the main spring housing is occluded by an occluding member.

Thus, as shown in FIG. 7, the sub-spring housing 200 can be rotatable based on the hinge 300*a* as a rotation center, and accordingly, one end of the main spring housing 100 may be selectively opened and closed according to the rotation of the sub-spring housing 200.

Figure 5:
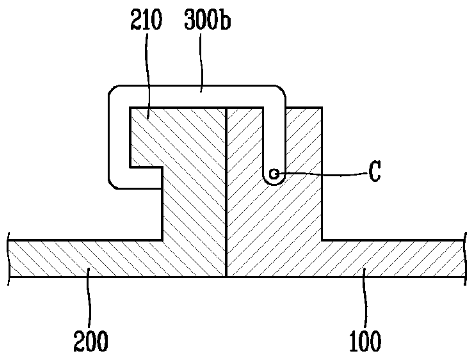
FIG. 5 is a partial sectional view showing a connection configuration of a main spring housing and a sub-spring housing according to a preferred embodiment of the present invention.

As can be understood from FIG. 5, in order to connect or separate the sub-spring housing 200 and the other end portion of the main spring housing 100, the spring housing unit according to the preferred embodiment of the invention may further comprise a protruded portion 210 and a hook 300*b*.

As shown in FIG. 5, the protruded portion 210 is provided on the sub-spring housing 200, and the hook 300*b* may be rotatably installed on the main spring housing 100 such that it corresponds to the protruded portion 210. Also, the hook

300*b* is rotatable to a position at which it is caught by the protruded portion 210 to connect the sub-spring housing 200 to the main spring housing 100 and to a position at which the hook 300*b* is separated from the protruded portion 210 to release the sub-spring housing 200.

Figure 9:
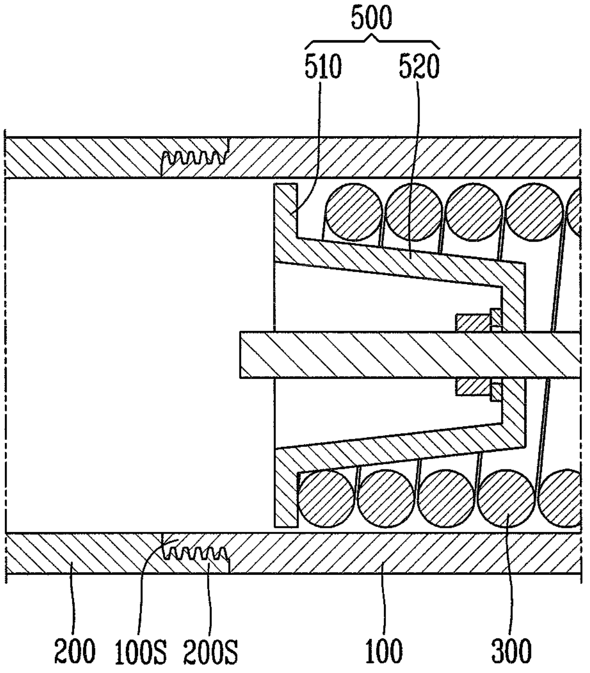
FIG. 9 is a partial sectional view showing a connection configuration of the main spring housing and the sub-spring housing according to another embodiment of the present invention.

As can be understood from FIG. 9, in order to connect or separate the sub-spring housing 200 and the other end portion of the main spring housing 100, in the spring housing unit connected to a spring actuator for a switchgear according to another embodiment of the present invention, the sub-spring housing 200 and the other end portion of the main spring housing 100 comprise a threaded portion 200S and a threaded portion 100S which can be meshed with each other.

Also, as shown in FIG. 3, the spring housing unit connected to the spring actuator for a switchgear according to an embodiment of the present invention may further comprise a first connection rod 610 and a second connection rod 620.

The first connection rod 610 is installed within the main spring housing 100, meshed with the compressing cover 500 so as to be moved together, and having one end portion extending to pass through the compressing cover 500 and the other end portion connected to the spring actuator 1.

Figure 6:
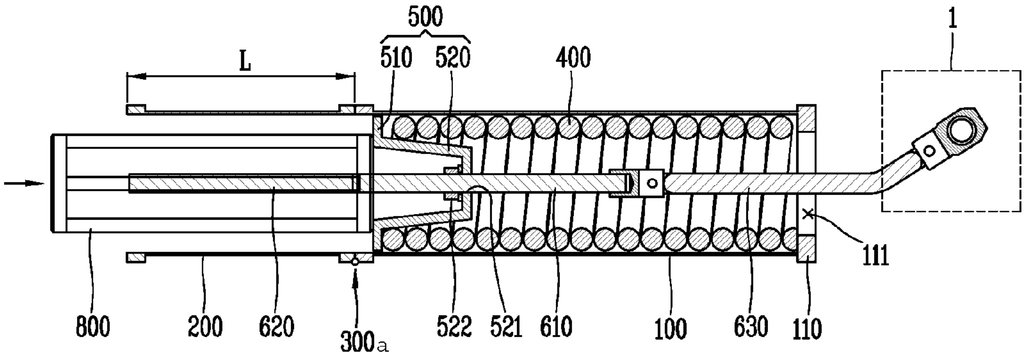
FIG. 6 is a view showing a state in which a spring is being assembled in a spring housing unit according to an embodiment of the present invention.

Also, in order to fix the compressing cover 500 to a predetermined position on an outer circumferential face of the first connection rod 610 against the spring 400, as shown in FIG. 3 or 6, the spring housing unit according to an embodiment of the present invention further comprises a support bushing 522 having an inner circumferential face formed as a threaded face and meshed with the outer circumferential face of the first connection rod 610.

The support bushing 522 is installed to be meshed with the outer circumferential face of the first connection rod 610 so as to be in contact with an inner wall of the protruded body portion 520 of the compressing cover 500, supporting the compressing cover 500 such that slip is prevented against elastic force of the spring 400.

The first connection rod 610, which is driven by the spring actuator 1, is movable in a first direction along with the compressing cover 500 to compress the spring 400 to charge elastic energy or movable in a second direction along with the compressing cover 500 by the spring 400 in a direction in which the spring 400, discharging elastic energy, is elongated.

The second connection rod 620 is installed within the sub-spring housing 200 and connected to one end portion of the first connection rod 610 such that it can be separated therefrom, and has a predetermined length.

Figure 4A:
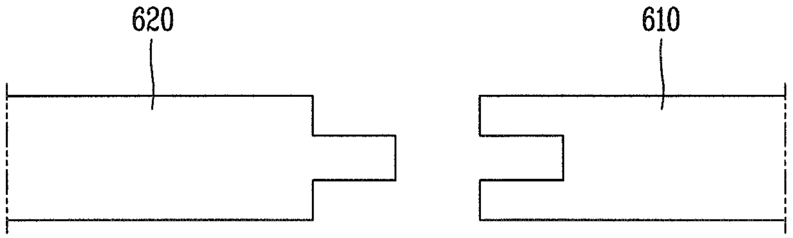
FIG. 4A is a view showing a connection configuration of first and second connection rods according to a first preferred embodiment of the present invention.
Figure 4B:
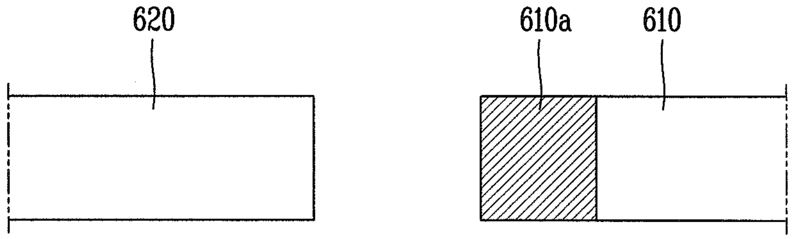
FIG. 4B is a view showing connection configuration of first and second connection rods according to a second preferred embodiment of the present invention.

As can be understood from FIG. 4B, according to an embodiment of the present invention, one end of the first connection rod 610 and one end of the second connection rod 620 are configured as a magnet 610*a* and an iron member so as to be tightly in contact or separated.

Figure 4C:
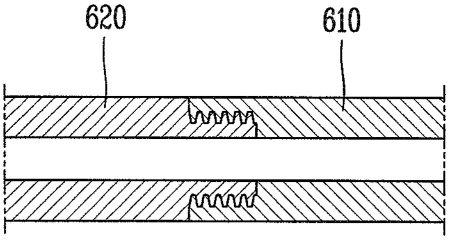
FIG. 4C is a view showing connection configuration of first and second connection rods according to a third preferred embodiment of the present invention.

As can be understood from FIG. 4C, according to an embodiment of the present invention, one end of the first connection rod 610 and one end of the second connection rod 620 may have a threaded portion so as to be meshed or separated.

Also, as can be understood from FIG. 4A, according to another embodiment of the present invention, one end of the first connection rod 610 and one end of the second connection rod 620 may have a protrusion and a protrusion accommodation recess portion, respectively, so as to be inserted to be coupled or drawn to be separated.

Also, the spring housing unit connected to a spring actuator for a switchgear may further comprise a chain 630.

One end of the chain 630 is connected to the other end portion of the first connection rod 610 within the main spring housing 100, and the other end of the chain 630 is connected to extend to the outer side of the main spring housing 100 so as to be connected to the spring actuator 1.

Figure 8:
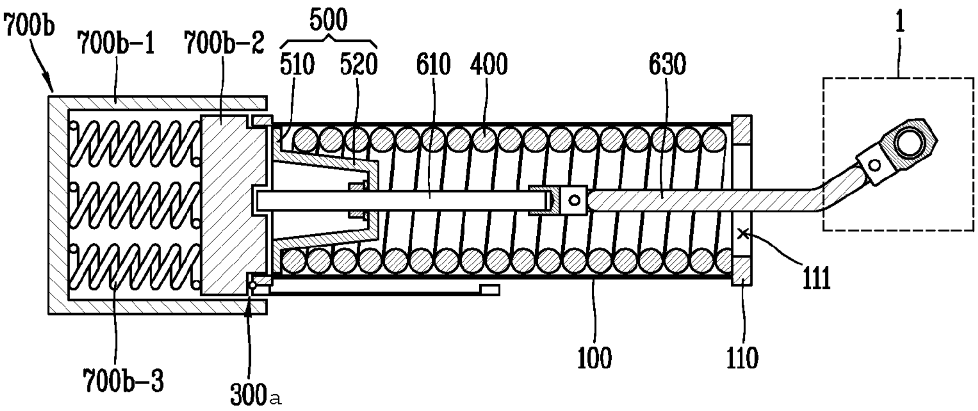
FIG. 8 is a view showing an assembled state in which an opened end portion of the main spring housing is occluded by a damper that can replace the occluding member according to an embodiment of the present invention.

According to an embodiment of the present invention, as can be understood from FIGS. 7 and 8, the spring housing connected to a spring actuator for a switchgear may further comprise occluding members 700*a* and 700*b* installed to occlude the other end portion of the main spring housing 100 when the sub-spring housing 200 is separated from the main spring housing 100.

As can be understood from FIGS. 7 and 8, the occluding members 700*a* and 700*b* may be configured as any one of a closing cap 700*a* and a damper 700*b* inserted into the other end portion of the main spring housing 100 to occlude the interior of the main spring housing 100.

In FIG. 7, according to an embodiment of the present invention, threaded portions may be provided on the closing cap 700*a* and on the end portion of the main spring housing 100 so as to be connected by thread meshing. Any other modifications may be implemented.

In FIG. 8, the damper 700*b* may comprise a damper housing 700*b*-1 providing an outer case, a damping body portion 700*b*-2 supported by the damper housing 700*b*-1 and installed to face the compressing cover 500 of the main spring housing 100, and a buffer spring 700*b*-3 elastically supporting the damping body portion 700*b*-2 within the damper housing 700*b*-1.

In FIG. 8, according to an embodiment of the present invention, threaded portions may be provided on an end portion of the damper housing 700*b*-1 and on the end portion of the main spring housing 100 so as to be connected by thread meshing. Any other modifications may be implemented.

Meanwhile, a process of assembling and disassembling the spring housing unit will be described with reference to FIGS. 3 to 9.

FIG. 6 is a view showing a state in which the spring housing unit is assembled according to an embodiment of the present invention.

First, in FIG. 6, in a state in which one end of the spring 400 is supported by the flange portion 110 of the main spring housing 100, the spring 400 is positioned within the main spring housing 100. Here, the spring 400 is not compressed yet.

Next, the chain 630 is connected to one end portion of the first connection rod 610 to form an assembly, and the corresponding assembly is installed to pass through the center of the spring 400 within the main spring housing 100.

And then, the compressing cover 500 is entered into the main spring housing through the opened end portion of the main spring housing 100 and, at the same time, the other end portion of the first connection rod 610 passes through the through hole 521.

Thereafter, the sub-spring housing 200 is connected to the main spring housing 100 by the hinge 300*a* as shown in FIG. 3 or by the protruded portion 210 and the hook 300*b* as shown in FIG. 5, or by the threaded portion 200S and the threaded portion 100S as shown in FIG. 9.

Subsequently, the first connection rod 610 and the second connection rod 620 are connected by attaching the magnet 610*a* and the iron member as shown in FIG. 4*b* or by thread-meshing the threaded portion of one end of the first connection rod 610 and the threaded portion of one end of the second connection rod 620 as shown in FIG. 4C, or by insertion-coupling the protrusion accommodation recess portion and the protrusion of one end of the first connection rod 610 and one end of the second connection rod 620 as shown in FIG. 4A.

Thereafter, as can be understood from FIG. 6, the compressing cover 500 is pressed by a spring jig 800 so as to be pushed into the main spring housing 100, whereby the spring 400 is compressed by the length L, which is equivalent to the predetermined initial compression length and equivalent to the length of the sub-spring housing 200, between the movable compressing cover 500 and the flange portion 110 of the fixed main spring housing.

And then, the support bushing 522 is installed to be meshed with the outer circumferential face of the first connection rod 610 so as to be in contact with an inner wall of the protruded body portion 520 of the compressing cover 500.

After the support bushing 522 is installed, the spring jig 800 is removed.

Also, the sub-spring housing 200 is separated from the main spring housing 100, and the second connection rod 620 is separated from the first connection rod 610.

Accordingly, the operation of installing the spring 400 in the main spring housing 100 is completed.

In this state, by connecting the chain 630 to the first connection rod 610 is connected to the spring actuator 1, the connection of the assembly of the spring 400 and the main spring housing 100 to the spring actuator 1 is completed, thus turning into an operation standby state for closing or opening a circuit breaker.

As described above, in the spring housing unit according to an embodiment of the present invention, after the spring 400 is installed in the main spring housing 100, the sub-spring housing 200 having the length corresponding to the initial compression length L of the spring 400 can be removed, thus obtaining an effect of reducing the size of the spring housing.

Also, in the spring housing according to an embodiment of the present invention, since the occluding members 700*a* and 700*b* are installed to occlude the opened end portion of the main spring housing 100 present at the side where the spring 400 is elongated when electric energy thereof is discharged, the main spring housing 100 can be separated from the spring actuator 1 without having to discharge the elastic energy of the spring 400 by the initial compression distance.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A spring housing unit comprising:

a spring;

a main spring housing having a uni-body configured as a hollow cylinder and including:

a first end; and a second end linearly opposed to the first end;

a flange formed on the first end of the main spring housing and arranged to support a first end of a the spring;

a second unit pivotably connected to the main spring housing, the second unit being one of a sub-spring housing or an occluding member, the occluding member being one of a closing cap or a damper; and a compressing cover inserted within the second end of the main spring housing and arranged to support a second end of the spring such that an entirety of the spring is contained within the main spring housing, wherein the spring housing unit is configured to operate the spring in order to open or close an electric power circuit.

2. The spring housing unit of claim 1, wherein the second unit comprises the sub-spring housing.

3. The spring housing unit of claim 1, wherein the second unit comprises the occluding member.

4. The spring housing unit of claim 3, wherein the occluding member is the damper and comprises:

a damper housing;

a damper body; and a damper spring between the damper housing and the damper body.

5. The spring housing unit of claim 1, further comprising:

a rotatable fastener configured to detachably connect or separate the second unit from the second end of the main spring housing, wherein the rotatable fastener is one of a hinge or a hook.

6. The spring housing unit of claim 5, wherein the second unit includes a protrusion configured to abut the second end of the main spring housing, and wherein the rotatable fastener is the hook, the hook being arranged to rotate to a first position at which the hook is caught by the protrusion so as to connect the second unit to the second end of the main spring housing and to a second position at which the hook is separated from the protrusion so as to release the second unit from the second end of the main spring housing.

7. The spring housing unit of claim 1, wherein the second end of the main spring housing is connectable to the second unit via a threaded connection.

8. The spring housing unit of claim 1, further comprising:

a spring actuator; and a first connection rod configured to be installed along a center axis of a compression direction of the spring within the main spring housing and having a first end arranged to pass through the compressing cover and a second end connectable to the spring actuator, wherein the first connection rod is configured to connect to the compressing cover so that the first connection rod and the compression cover are able move together within the main spring housing, wherein, upon being driven by the spring actuator, the first connection rod is movable in a first direction within the main spring housing along with the compressing cover to compress the spring so as to charge the spring with elastic energy, and wherein the first connection rod is movable by the spring in a second direction within the main spring housing opposite from the first direction along with the compressing cover so as to discharge the elastic energy of the spring.

9. The spring housing unit of claim 8, wherein the second unit is the sub-spring housing, and wherein the spring housing unit further includes a second connection rod configured to be installed within the sub-spring housing and to be separably connected to the first end of the first connection rod via one of a mechanical connection and a magnetic connection.

10. The spring housing unit of claim 1, wherein the compressing cover is a uni-body that comprises:

an annular outer edge arranged to separate the second end of the spring from the second unit; and a protruded body portion connected to the annular outer edge and configured to be inserted within the second end of the spring.

11. The spring housing unit of claim 1, wherein the spring housing unit is configured to be received in a metal container charged with inert insulating gas or to form an enclosure of constituent components of a switching mechanism for each pole (or phase) with a solid insulating material.

* * * * *